United States Patent [19]

Kramer

[11] Patent Number: 5,119,406
[45] Date of Patent: Jun. 2, 1992

[54] DIGITAL SIGNAL SYNCHRONIZATION EMPLOYING SINGLE ELASTIC STORE

[75] Inventor: Erik J. Kramer, Reading, Mass.

[73] Assignee: AT&T Bell Laboratories, Murray Hill, N.J.

[21] Appl. No.: 530,774

[22] Filed: May 30, 1990

[51] Int. Cl.$^5$ ............................................. H04L 7/02
[52] U.S. Cl. .................................. 375/118; 345/112; 370/101
[58] Field of Search ............... 375/118, 113, 112, 114; 370/105.4, 101, 102; 360/51.52

[56] References Cited

U.S. PATENT DOCUMENTS

| | | | |
|---|---|---|---|
| 4,045,613 | 8/1977 | Walker | 370/101 X |
| 4,347,620 | 8/1982 | Black et al. | 370/102 X |
| 4,811,340 | 3/1989 | McEachern et al. | 375/118 X |
| 4,928,275 | 5/1990 | Moore et al. | 375/102 |

OTHER PUBLICATIONS

American National Standard for Telecommunications, "Digital Hierarchy Optical Interface Rates and Formats Specifications (SONET", dated Feb. 1990, pp. 1-110.
Technical Advisory, TA-TSY-000253, Issue 4, "Sonet Transport Systems: Common Generic Criteria", Bell Communications Research, Feb. 1989, pp. 6-85.
GLOBECOM'85, IEEE Global Telecommunications Conference, Conference Record Vol. 3 or 3, "SONET (Synchronous Optical Network)", R. J. Boehm et al., pp. 1443-1450.

Primary Examiner—Douglas W. Olms
Assistant Examiner—Tesfaldet Bocure
Attorney, Agent, or Firm—T. Stafford

[57] ABSTRACT

An incoming data signal including so-called gaps is synchronized to a new outgoing clock signal by employing a single elastic store and a smooth write address. An elastic store write address is generated in response to an incoming clock signal and is inhibited from advancing during the gaps in the incoming data signal. A smooth clock signal is obtained by appropriately dividing the incoming clock signal by a value dependent on the duration of the gaps in a predetermined portion of the incoming data signal. The smooth clock signal is used to control a counter to generate a smooth write address. The smooth write address is supplied to a phase detector. An adjusted read address is generated in response to the new outgoing clock signal and is supplied to the elastic store and to the phase detector. A counter used to generate the adjusted read address is inhibited from advancing during intervals in which gaps are to appear in the output data signal from the elastic store. A stuff decision is made at predetermined stuff decision points which are strategically placed relative to the positions of the gaps to be inserted in the outgoing data signal so that apparent jumps in a write-read separate signal generated by phase detector do not affect the stuff decision.

14 Claims, 1 Drawing Sheet

5,119,406

DIGITAL SIGNAL SYNCHRONIZATION EMPLOYING SINGLE ELASTIC STORE

CROSS-REFERENCE TO RELATED APPLICATION

U.S. patent application, Ser. No. 07/530,775 was filed concurrently herewith.

TECHNICAL FIELD

This invention relates to digital transmission system and, more particularly, to synchronizing an incoming digital signal at an incoming clock signal to a locally generated output clock signal.

BACKGROUND OF THE INVENTION

In digital transmission systems it is often required to align an incoming data signal to a new reference clock signal. Typically, the incoming data signal is aligned to a first reference clock signal and an outgoing data signal is aligned to the new reference clock signal. The first and new reference clock signals, although usually being at the same nominal rate, tend to vary with respect to each other. They exhibit characteristics such as wander, jitter, phase differences and the like. Elastic store arrangements have typically been employed to minimize the effects of these characteristics. These elastic store arrangements required some mechanism to prevent underflow and overflow of the data. To this end, the separation between the elastic store write address and read address was obtained by employing a phase detector and used to control the rate at which the data was read out of the elastic store. Such a mechanism is commonly known as stuffing.

In some digital transmission systems, however, there are so-called "gaps" in the incoming data signal. That is, there are portions of the incoming data signal that do not include information which is to be passed through the elastic store. Examples of such digital transmission signals are the DS3 digital signal, DS1 digital signal, SONET STS1 signal, SONET VT signal and the like.

In a typical elastic store arrangement, the write address is incremented after each element of the incoming data signal has been written. However, when one or more gaps appear in the incoming data signal, incrementing of a write address counter is inhibited for the one or more gap interval(s). This inhibiting of the write address counter can cause apparent "jumps" in the separation between the elastic store write address and read address which, in turn, causes undesirable stuffing. The technique usually employed to eliminate the write-read address separation jump problem involves the use of a first elastic store and associated phase detector to smooth out the gaps in the incoming data signal and to appropriately adjust the first reference clock signal. The smooth data and an adjusted first reference clock signal are then supplied to a second synchronizing elastic store and associated phase detector which yields the desired data signal that is synchronized to the new reference clock signal. Although the use of the additional elastic store and phase detector solves the problem, such a solution is undesirable because it is expensive to implement. Additionally, use of the additional smoothing elastic store introduced unnecessary time delay through the smoothing process.

SUMMARY OF THE INVENTION

Problems of prior synchronization arrangements employing elastic stores are overcome, in accordance with this invention, by employing a single elastic store and associated phase detector and "smoothing" the write address supplied to the phase detector in accordance with prescribed criteria dependent on the "gaps" in the incoming data signal.

More specifically, an elastic store write address is generated in response to a first reference clock signal which is not advanced for the duration of detected gaps in the incoming data signal. A separate so-called smooth write address is also derived from the first reference clock signal. The incrementing rate of the smooth write address is dependent on the duration of detected gaps in and the data rate of the incoming data signal. This smooth write address is supplied to the phase detector. An elastic store read address is generated in response to a locally obtained output clock signal and is adjusted in response to a write-read address separation signal from the phase detector. The adjusted read address is inhibited from advancing during intervals that gaps are to be inserted in the output data signal from the elastic store. The adjusted read address is also supplied to the phase detector.

In one embodiment of the invention, a desired smooth write clock signal is obtained by detecting the duration of at least one gap in a predetermined portion of the incoming data signal and appropriately dividing the first reference clock signal. Additionally, since an at least one gap to be inserted in a predetermined portion of the outgoing data signal is positioned in a predetermined relationship to so-called stuffing decision points of the outgoing data signal, it does not affect the write-read address separation signal being generated at the time of the stuffing decision points. Consequently, erroneous stuffing in the output signal is advantageously avoided.

DETAILED DESCRIPTION

Figure 1:
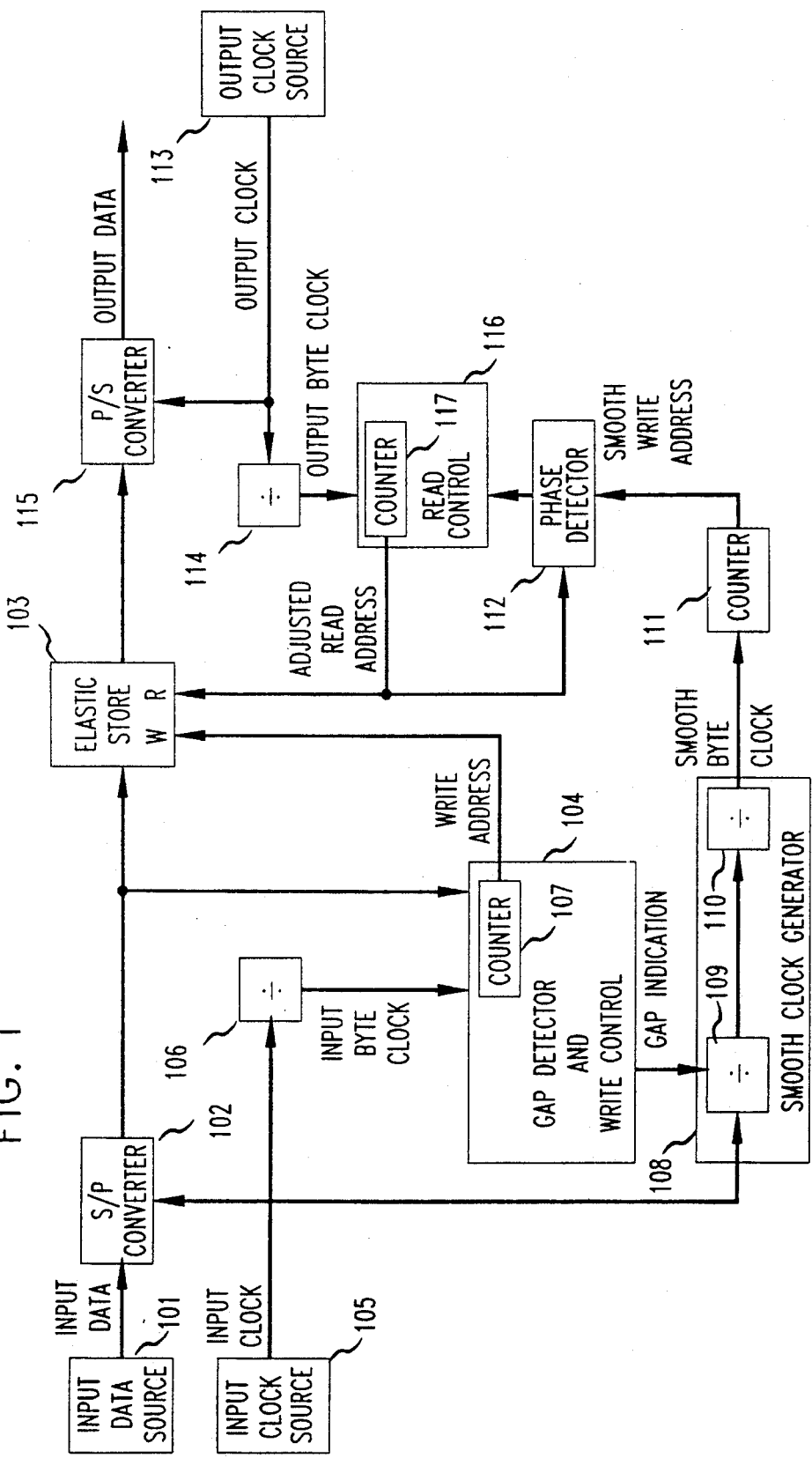
FIG. 1 shows, in simplified block diagram form, details of a synchronization arrangement including an embodiment of the invention.

FIG. 1 shows a digital synchronization arrangement including an embodiment of the invention. Accordingly, a digital transmission signal to be synchronized to a local output clock signal is supplied from input data source 101 to serial to parallel (S/P) converter 102. As indicated above, the incoming data signal can be any one of a number of digital transmission signals having gaps in the data to be supplied to elastic store 103. By way of example and not to be construed as limiting the scope of the invention, a SONET STS1 signal is assumed which is supplied in bytes, i.e., eight (8) parallel bits to elastic store 103. It will be apparent to those skilled in the art that the incoming data signal could also be supplied in serial bit form to elastic store 103. As is known, the SONET STS1 signal has a transmission rate of 51.840 Mbits/sec and includes a frame having nine (9) rows of information. Each row includes 90 bytes of information usually comprising 87 bytes of user data preceded by a "gap" having a duration of three (3) byte intervals. However, if the incoming data signal has been "stuffed", for example, with an additional byte of user data the gap duration is only two byte intervals. Similarly, if the incoming data signal has been "stuffed" with an additional byte of non-user data the gap duration is four byte intervals. Thus, in this example, the particular row of the incoming SONET STS1 signal designated for stuffing may comprise 87 bytes of user data and a gap of three (3) byte intervals, or 88 bytes of user data and a gap of two (2) byte intervals, or 86 bytes of user data and a gap of four (4) byte intervals. See for example, the ANSI Draft Standard entitled "Digital Hierarchy—Optical Interface Rates and Formats Specifications (SONET)", dated February 1990 and a Technical Advisory entitled "SONET Transport Systems: Common Generic Criteria", TA-TSY-000253, Bell Communications Research, February 1989 for details of the SONET STS1 signal and stuffing criteria.

S/P converter 102 converts the serial input signal into parallel bytes including eight (8) bits and supplies the bytes to a data input of elastic store 103 and to gap detector and write control unit 104. An incoming clock signal is supplied from input clock source 105 to S/P converter 102, divider 106 and smooth clock generator 108. It is noted that the SONET STS1 clock is 51.840 MHz and frame sync is 8 KHz. Divider 106 divides the input clock signal by eight (8) to obtain an input byte clock signal of 6.480 MHz. In turn, the input byte clock signal is supplied to gap detector and write control 104 and, therein, to counter 107. Counter 107 is employed to generate the write address for elastic store 103, in well known fashion. The write address is supplied to a write (W) input of elastic store 103. It should be noted that an incoming frame sync signal is also employed to denote the STS1 frames, but is not shown for clarity of exposition.

Gap detector and write control 104 is employed to detect the gaps in the incoming data signal. This is realized by detecting the particular information in the predetermined gap byte positions. This information will also indicate whether the stuff byte positions include data or non-data. Again, see the ANSI draft standard and Technical Advisory, noted above, regarding details of stuffing in the STS1 signal. Gap detector and write control 104 operates to inhibit counter 107 from advancing the write address for so-called gap bytes and supplies a representation of the number of byte intervals in the gap, i.e., a gap indication, in a row of the STS1 signal to smooth clock generator 108 and, therein, to controllable divider 109. The gap indication is a first control signal representative of the duration of the detected gap, i.e., the number of byte intervals in the gap. For the STS1 signal, controllable divider 109 is responsive to the gap indication to divide the input clock of 51.840 MHz by 90/88 when the STS1 signal row has a gap of two (2) byte intervals duration (one gap byte includes user data), by 90/87 when the STS1 signal row has a gap of the usual three (3) byte intervals duration and by 90/86 when the STS1 signal row has a gap of four (4) byte intervals duration (an additional gap byte is stuffed with non-data). The smooth clock signal output from controllable divider 109 is supplied to divider 110 which, in this example, divides it by eight (8) to yield a smooth byte clock signal. Counter 111 in response to the smooth byte clock signal generates a smooth write address which, in turn, is supplied to phase detector 112. It is important to note that the smooth write address is substantially evenly distributed over the 90 byte row interval and does not include any gaps. That is, for a STS1 signal row including 88 bytes of incoming user data to be supplied to elastic store 103, the corresponding 88 write addresses generated by counter 111 are evenly, i.e., smoothly, distributed over the 90 byte STS1 signal row interval. If the STS1 signal row includes 87 bytes of user data, the corresponding 87 write addresses generated by counter 111 are evenly distributed over the 90 byte STS1 signal row interval. Similarly, if the STS1 signal row includes 86 bytes of user data, the corresponding 86 write addresses generated by counter 111 are evenly distributed over the 90 byte STS1 signal row interval. Therefore, the smooth write addresses supplied to phase detector 112 do not include any gaps which would cause so-called "jumps" in a write-read address separation signal being generated by phase detector 112. The write-read address separation signal is a second control signal representative of the offset between the smooth write addresses and the adjusted read addresses. It is also noted that since the write address being generated by counter 107 is inhibited from advancing when gap bytes are detected, only user data is passed into elastic store 103. It is this user data that is to be synchronized to the new output clock signal from output clock source 113.

To this end, an output clock signal is obtained from output clock source 113. In this example, the output clock signal is also the STS1 signal clock of 51.480 MHz and is supplied to divider 114 and parallel to serial (P/S) converter 115. In this example, divider 114 divides the output clock signal by eight (8) to generate an output byte clock signal of 6.480 MHz which is supplied to read control 116. Read control 116 includes counter 117 for generating an adjusted read address which, in turn, is supplied to a read address (R) input of elastic store 103 and to phase detector 112. Counter 117 is controlled to be inhibited from advancing the read address when gap bytes are to appear in the output data bytes from the data output of elastic store 103. As indicated above regarding the incoming data bytes, 87 bytes of data are normally supplied as an output from elastic store 103 preceded by a gap of three (3) byte intervals duration which is obtained by inhibiting advancing counter 117 to form a STS1 signal row of 90 bytes. However, if data overflow is about to occur, i.e., too much data is in elastic store 103, an additional byte of data is supplied as an output in the STS1 signal row assigned for stuffing. That is, 88 bytes of data are supplied as an output from elastic store 103 preceded by a gap of two (2) byte intervals duration obtained by appropriately inhibiting advancing counter 117 to form the STS1 signal row assigned to stuffing. Similarly, when data underflow is about to occur, i.e., there is too little data in elastic store 103, 86 bytes of data are supplied as an output from elastic store 103 preceded by a gap of four (4) byte intervals duration obtained by appropriately inhibiting advancing counter 117 to form the STS1 signal row assigned to stuffing. That is, an additional gap byte including non-user data is included in the STS1 signal row assigned for stuffing. The data overflow and underflow conditions of elastic store 103 are determined by comparing the write-read address separation signal from phase detector 112 to predetermined threshold values, in well known fashion. It should be noted that so-called stuff decisions are made at predetermined points relative to the 90 bytes in the STS1 signal row assigned to include stuffing. Therefore, if the gap in the STS1 signal row assigned for stuffing is strategically placed relative to the stuff decision points, the gap in the adjusted read address will not affect the write-read address separation signal being generated by phase detector 112 at the stuff decision points. This result is attained because the smooth write address will eventually "catch up" to the adjusted read address by the time the stuff decision point is reached and because the write-read address separation signal is not evaluated, i.e., compared to the predetermined threshold values, in making a stuff decision until the stuff decision point is reached.

The outgoing data bytes from elastic store 103 are supplied to parallel to serial (P/S) converter 115 which yields the desired output data signal at the STS1 signal rate of 51.480 Mbits/s. Since P/S converter 115 is supplied with the 51.480 Mhz output clock signal, a gap will appear in the output data signal having a duration equal to the number of byte intervals that the adjusted read address is inhibited from advancing.

I claim:

1. Apparatus for synchronizing an input data signal at an input clock signal to a new output clock signal to yield an output data signal, comprising:
   a source of an input data signal;
   a source of an input clock signal;
   means for detecting at least one gap in a predetermined portion of a predetermined fixed interval of said input data signal and for generating a first control signal representative of the duration of said detected at least one gap;
   means supplied with said input clock signal and being responsive to said first control signal for generating write addresses which are inhibited from advancing during the duration of said detected at least one gap;
   means supplied with said input clock signal and being responsive to said first control signal for generating smooth write addresses which are evenly distributed over said predetermined fixed interval of the input data signal and varied in number dependent on the duration of said detected at least one gap;
   a source of an output clock signal;
   means supplied with said output clock signal and being responsive to a second control signal for generating adjusted read addresses which are inhibited from advancing during a predetermined portion of the output data signal for an interval determined by said second control signal;
   means supplied with said smooth write addresses and said adjusted read addresses for generating said second control signal; and
   elastic store means supplied with said input data signal, said write addresses and said adjusted read addresses, said write addresses being employed to write said input data signal into said elastic store means and said adjusted read addresses being employed to read the output data signal from said elastic store means, said output data signal being synchronized to said output clock signal.

2. The apparatus as defined in claim 1 wherein said means for generating said smooth write addresses includes controllable divider means responsive to said first control signal for dividing said input clock signal by a factor related to said predetermined fixed interval of said input data signal and said duration of said detected at least one gap to obtain a smooth clock which is evenly distributed over said predetermined fixed interval of said input data signal and means supplied with said smooth clock signal for generating said smooth write addresses.

3. The apparatus as defined in claim 2 wherein said means for detecting at least one gap includes means for determining the number of byte intervals in the detected at least one gap, said predetermined fixed interval of said input data signal comprises a predetermined total number of bytes and said duration of said at least one gap is one or more byte intervals and wherein said factor is a ratio of said total number of bytes over said total number of bytes less the number of byte intervals in said at least one gap.

4. The apparatus as defined in claim 3 wherein said means supplied with said smooth clock signal includes means for dividing said smooth clock signal by a predetermined number to obtain a smooth byte clock signal and counter means supplied with said smooth byte clock signal for generating said smooth write addresses.

5. The apparatus as defined in claim 2 wherein said means for generating said write addresses includes means for inhibiting advancing said write addresses for the number of byte intervals in said at least one gap.

6. The apparatus as defined in claim 5 wherein said detected at least one gap has a duration of one or more byte intervals, wherein said means for generating said write addresses further includes means for dividing said input clock signal by a predetermined number to obtain an input byte clock signal and counter means supplied with said input byte clock signal for generating said write addresses, and wherein said means for inhibiting advancing said counter means for said duration of said detected at least one gap.

7. The apparatus as defined in claim 6 wherein said means for generating said second control signal includes phase detector means for generating a signal representative of the separation, i.e., offset, between said smooth write addresses and said adjusted read addresses.

8. The apparatus as defined in claim 7 wherein said means for generating said adjusted read addresses includes means responsive to said second control signal for inhibiting advancing said adjusted read addresses for the duration of an at least one gap to be inserted in said output data signal.

9. The apparatus as defined in claim 8 wherein said at least one gap to be inserted in said output data signal has a duration of one or more byte intervals, wherein said means for generating said adjusted read addresses further includes means for dividing said output clock signal to obtain an output byte clock signal and counter means supplied with said output byte clock signal for generating said adjusted read addresses, and wherein said means for inhibiting inhibits advancing said counter means for said duration of said at least one gap to be inserted in said output data signal.

10. The apparatus as defined in claim 9 wherein said means for inhibiting is controlled so that said at least one gap is inserted in a predetermined portion of said output data signal and wherein said means for generating said adjusted read addresses further includes means for evaluating said second control signal at prescribed instants during a predetermined portion of said output data signal, said instants being in predetermined relationship to where said at least one gap is to be inserted in said predetermined portion of said output data signal.

11. The apparatus as defined in claim 10 wherein said input data signal is in serial form and further including serial to parallel converter means for converting said input data signal from said serial form into parallel bytes which are written into said elastic store means.

12. The apparatus as defined in claim 11 wherein said output data signal is being read from said elastic store means in parallel byte form and further including parallel to serial converter means for converting said parallel bytes of said output data signal being read from said elastic store means into serial form.

13. The apparatus as defined in claim 9 wherein said input data signal is a SONET STS1 signal, said predetermined fixed internal of said input data signal is a STS1 signal row including 90 bytes and wherein said input clock signal is a STS1 clock signal.

14. The apparatus as defined in claim 13 wherein said output data signal is a SONET STS1 signal, said predetemined portion of said output data signal is a STS1 signal row including 90 bytes and wherein said output clock signal is a STS1 clock signal.

* * * * *